(12) United States Patent
Tierney et al.

(10) Patent No.: US 7,469,347 B2
(45) Date of Patent: Dec. 23, 2008

(54) METHODS TO TEST MULTIMEDIA DEVICES ON COMPUTER SYSTEMS

(75) Inventors: Percy A Tierney, Seattle, WA (US); Tuan D. Le, Bothell, WA (US); Adrian Mircea Sima, Pitesti (RO); Wenhong Liu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 624 days.

(21) Appl. No.: 10/938,465

(22) Filed: Sep. 10, 2004

(65) Prior Publication Data

US 2006/0069795 A1 Mar. 30, 2006

(51) Int. Cl.
*G06F 1/00* (2006.01)
*G06F 3/00* (2006.01)

(52) U.S. Cl. .................................. 713/300; 710/15
(58) Field of Classification Search ................ 709/231, 709/224–226; 713/300–340; 710/15–19
See application file for complete search history.

(56) References Cited

U.S. PATENT DOCUMENTS

| | | | | |
|---|---|---|---|---|
| 6,025,827 A | * | 2/2000 | Bullock et al. ........... | 715/500.1 |
| 6,441,627 B1 | * | 8/2002 | Larson ....................... | 324/755 |
| 2003/0236906 A1 | * | 12/2003 | Klemets ...................... | 709/231 |
| 2004/0117846 A1 | * | 6/2004 | Karaoguz et al. ........... | 725/134 |

OTHER PUBLICATIONS

WHQL Test Specification. "TD-6.23 Audio or Video Capture and Control Test," Test Kit: HCT 11, shipped Mar. 28, 2003, 1 page.
WHQL Test Specification, "TD-6.24 AV/C Tape Subunit Compliances Test," Test Kit: HCT 11, shipped Mar. 28, 2003, 1 page.
WHQL Test Specification, "TD-6.23 Audio or Video Capture and Control Test," Test Kit: HCT 12, HCT 11, shipped Aug. 11, 2004, 2 pages.
WHQL Test Specification, "TD-6.24 AV/C Tape Subunit Compliance Test." Test Kit: HCT 12, HCT 11, built Jul. 30, 2004, 2 pages.

* cited by examiner

*Primary Examiner*—Christopher B Shin
(74) *Attorney, Agent, or Firm*—Lee & Hayes, PLLC

(57) ABSTRACT

The described embodiments relate to testing streaming media capture devices and/or computer systems. One exemplary method enumerates and tests multiple streaming media capture device which are operably associated with a computer. The method simultaneously exercises said computer's display and power states.

12 Claims, 3 Drawing Sheets

METHODS TO TEST MULTIMEDIA DEVICES ON COMPUTER SYSTEMS

TECHNICAL FIELD

The present invention relates to systems and methods for testing streaming media capture devices for functionality relative to a computer system.

BACKGROUND

A multitude of various streaming media devices, such as webcams, microphones, broadcast receivers and camcorders are available to the consumer. Streaming media devices are hardware, software, firmware and/or a combination thereof configured to send external multimedia data into a computing device such as a PC. These streaming media devices are referred to herein as "capture" devices. Multimedia includes audio, video, audio/video, and related control service streams, such as broadcast television Vertical Blanking Interval VBI services. Examples of external multimedia can include both "live" (captured by microphone and camera) and "recorded" (previously recorded multimedia data). Sending the external multimedia into the computing device can increase the functionality available to the consumer. For example coupling a capture device to a PC may allow a consumer to display images, edit, store media, and copy media from the capture device, among others.

When consumers couple a capture device or devices with a computer they expect the system to perform as expected. Some standards exist for establishing protocols for specific classes of capture devices. However these protocols fall short of addressing the combined system of a computer and one or more capture devices and interoperability of devices within the system where the computer is simultaneously running multiple applications. Testing the capture devices both for compliance with existing standards and for testing various user scenarios can detect erroneous device behavior, which can then be corrected, such as with an improved device/driver. This testing and feedback for multiple scenarios allows device developers the means to build a device which meets both industry standards (where they exist) and consumer expectations.

SUMMARY

Computer systems and methods of testing the computer systems are described herein. The methodology can test various aspects of a capture device(s) of the computer system. Such testing can include capture device conformance to applicable standards, device interoperability, and application level end user streaming scenarios. In one implementation the method enumerates and tests multiple streaming media capture devices which are operably associated with a computer. The method can simultaneously exercise the computer's display and power states.

Another implementation can enumerate streaming media capture devices coupled to a computing device and ascertain the topology of each individually enumerated streaming media capture device. The method can then test the topology of the individually enumerated streaming media capture devices.

BRIEF DESCRIPTION OF THE DRAWINGS

The same numbers are used throughout the drawings to reference like features and components wherever feasible.

DETAILED DESCRIPTION

Overview

In the various embodiments described below, one or more capture devices can be tested in relation to a computer system with which the devices can be used. One type of capture device is a streaming media capture device which comprises audio capture devices, video capture devices and capture devices which capture both audio and video.

Audio capture devices include, but are not limited to, microphones, internet telephones, and radio receivers, which can be standalone devices. For example, an audio capture device can comprise part of a sound card. Alternatively or additionally, audio capture devices can be integrated into a single physical device with a video capture device. Video capture devices can be digital 'still' cameras, and or video or movie cameras. A still camera is optimized to capture high resolution images individually, whereas a video or movie camera is optimized to capture individual images at a high frame rate to produce a motion picture. Further, many 'still' cameras now have video or movie modes, while many video cameras have 'still' shot capabilities. Video capture devices include, but are not limited to, DV/DV Pro/MPEG2 camcorders, D-VHS tape decks, video cameras (USB and 1394 webcams), and IP tuners. IP tuners are TV tuners designed to receive broadcast data over an IP network. The broadcast data can include Standard Definition TV (SDTV), High Definition TV (HDTV) and digital TV among others.

The rapid growth of capture devices which interface with computers has produced a wide range of devices, such as those named above and others, with varying levels of functionality and robustness. Some of these capture devices have media storage capabilities which can allow captured media to be downloaded to the computer, edited, and the edited media rendered back to the capture device for recording.

Testing capture devices which are communicatively coupled to a computer allows the functionality and interoperability of the capture devices to be more rigorously tested than can be achieved in isolation. Further, some of the implementations described below allow testing of multiple capture devices simultaneously. In some of these implementations the methodology can test all of the capture devices of a computing system simultaneously.

The test methodology can ascertain which capture devices are coupled to a computer and can determine a state of the individual capture devices, as well as a state of the computer. The testing methodology can then test the capture devices while simultaneously changing or cycling the state of the computer.

Various aspects of the test methodology can allow capture device manufacturers to test and improve their product before positioning the product in the marketplace. Other aspects of the testing methodology can be utilized by various other classes of users including the end use consumer.

Exemplary Embodiments

Figure 1:
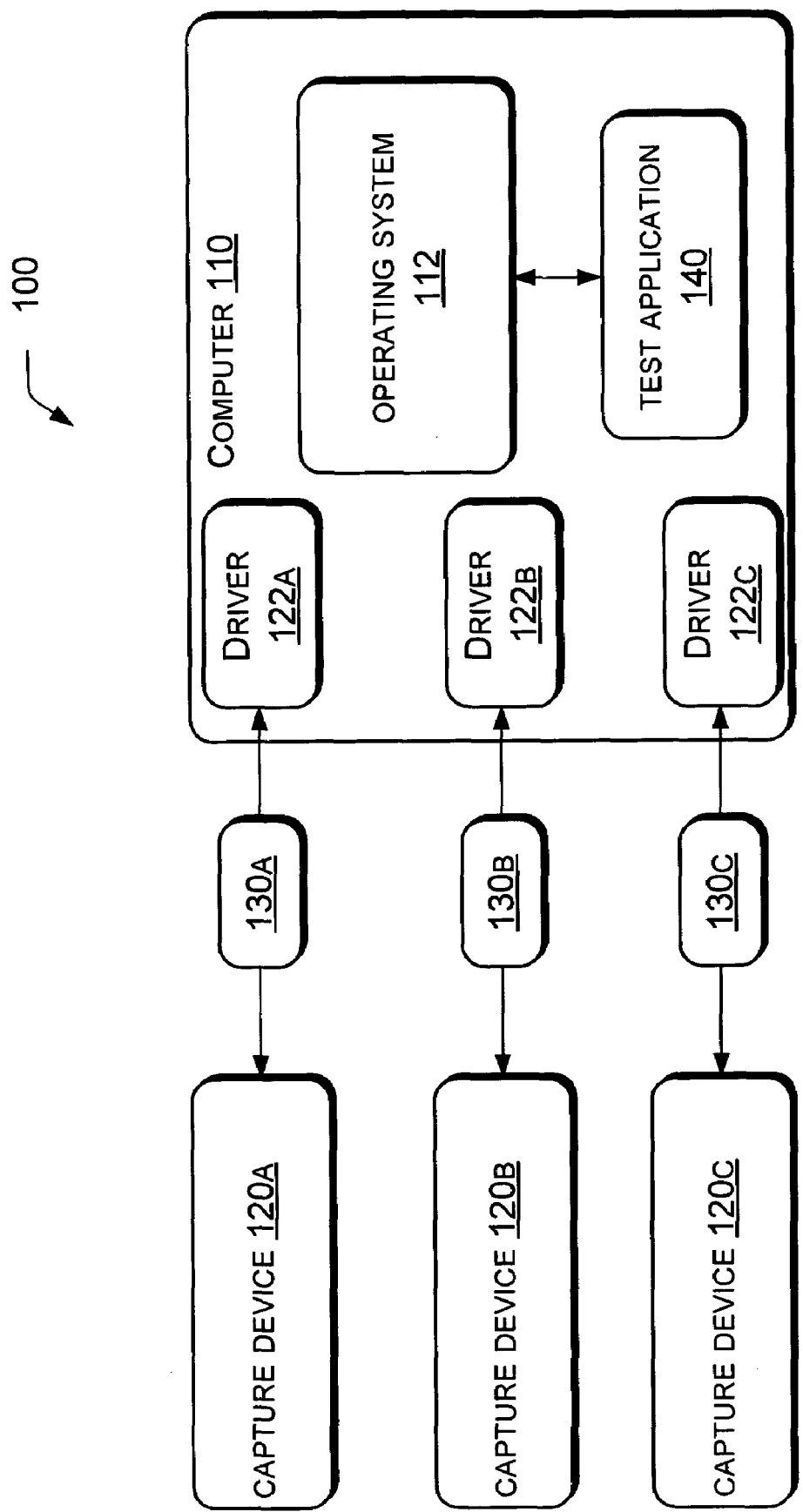
FIG. 1 illustrates a block diagram of a computer system in accordance with one embodiment.

FIG. 1 illustrates a high level diagrammatic representation of a computing system 100 in accordance with one embodiment. Computing system 100 comprises a computer 110 which includes a computer operating system 112. One or more capture devices can be communicatively coupled to the computer. For purpose of explanation, FIG. 1 includes three capture devices 120A-120C. Individual capture devices can include a device driver 122A-122C respectively, through which the computer's operating system communicates with a respective capture device 120A-120C. Individual capture devices can be communicatively coupled to the computer utilizing various buses or can be an integral component of the computer. In this particular instance, capture device 120A is coupled to computer 110 via an IEEE 1394 bus 130A. Capture device 120B is coupled via PCI bus 130B while capture device 120C is coupled via a universal serial bus (USB) 130C.

Computer system 100 can further include a test application 140 which runs on operating system 112 and is configured to test various interoperability aspects of computer 110 and individual capture devices 120A-120C. A more detailed example of an exemplary computer system configuration is provided below in relation to FIG. 3.

Exemplary Method

Figure 2:
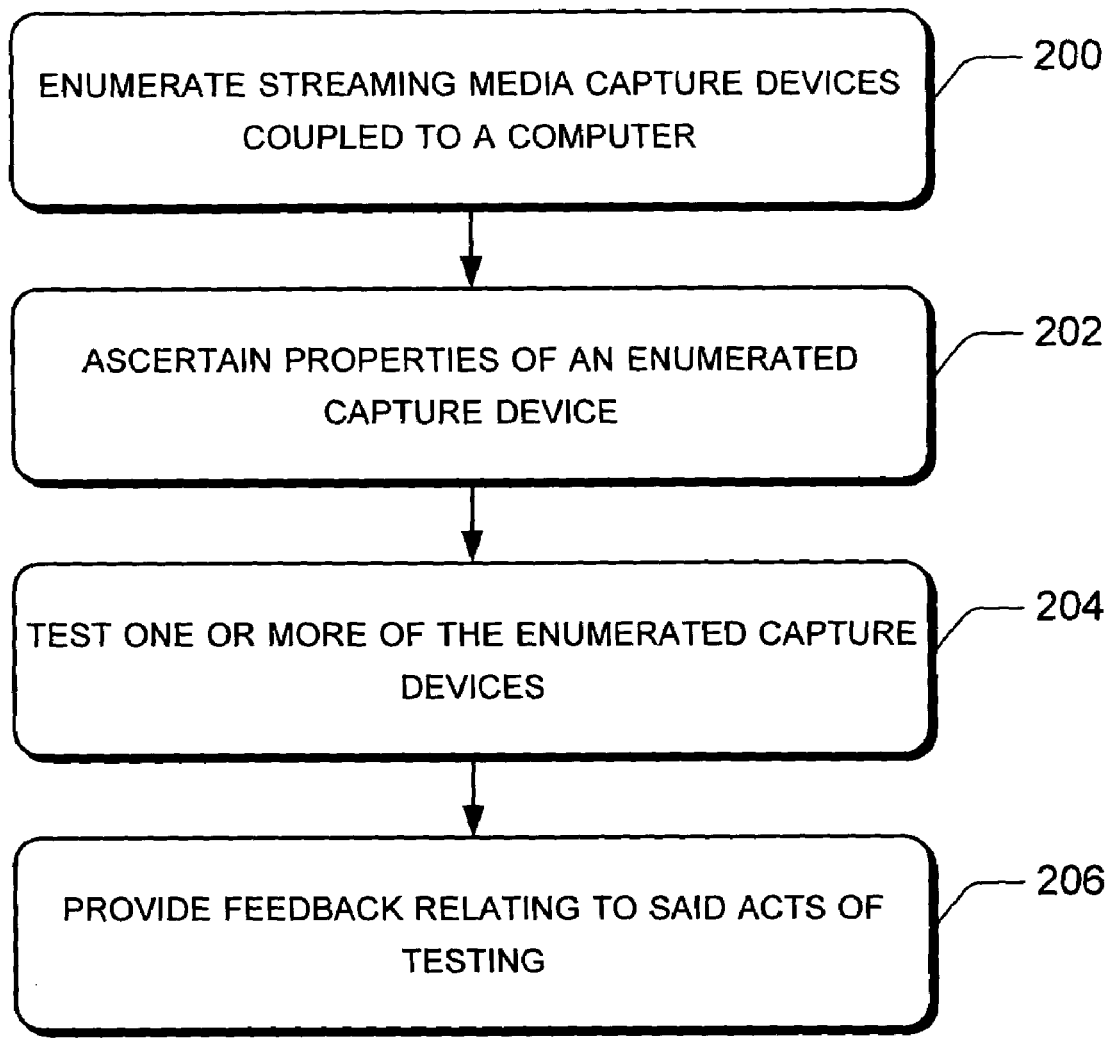
FIG. 2 is a flow diagram that describes acts of an exemplary method in accordance with one embodiment.

FIG. 2 illustrates steps in an exemplary method in accordance with one embodiment. The method can be implemented in connection with any suitable hardware, software, firmware or combination thereof. The method can be implemented using various techniques. For example, the method can be employed utilizing filter graph technologies among others. In one embodiment, the method can be implemented using an exemplary software architecture such as is described above and below, in connection with a computer system such as that described below in relation to FIG. 3. It is to be appreciated and understood, however, that other software architectures and computer systems can be utilized without departing from the spirit and scope of the claimed subject matter. In addition, it is to be appreciated that some of the acts described in this figure need not occur in the order in which they appear in the flow diagram.

Act 200 enumerates streaming media capture devices coupled to a computer. In some implementations, the method queries the computer's operating system for capture devices coupled to the computer. For example, the method may query one or more application program interfaces (APIs) which track various devices, including capture devices, which are communicably coupled to the computer's operating system. The method may cache the information relating to the identified capture devices for use in one or more acts described below. The method may also determine other components comprising the computer system and/or properties of the computer system. Such components may include displays, display cards and speakers, among others. Such properties can include the ability of the computer to support power management among others.

Act 202 ascertains properties of an enumerated capture device. In some implementations the method can ascertain the properties, at least in part, by interrogating individual capture devices and/or their device drivers about their properties. For purposes of explanation this description refers to communication with a capture device and/or its device driver interchangeably.

Some implementations may interrogate a specific capture device about its properties and then proceed to act 204 to test one or more of the properties.

An alternative implementation can interrogate all or more than one of the capture devices identified at act 200 and cache the information for use in subsequent testing. The method can interrogate a capture device to build a picture of the features and properties which the device claims to support. In but one example, the interrogation may be achieved via one or more APIs which interface various categories of capture devices.

Act 204 can test one or more of the enumerated capture devices. In some implementations capture device testing can occur automatically such that the method automatically initiates the testing process. Still other implementations can interactively allow a user to specify an individual device or devices to be tested. For example, in such an instance the enumerated capture devices can be listed in an interactive test suite selection menu accessible by a user.

In the automatic case mentioned above, the method may automatically begin testing devices according to some set of criteria. For example the method may begin testing the capture devices in the order in which they were enumerated.

The tests which are run can be specific to the properties determined from interrogating a given device, predetermined, or a combination thereof. The test methodology may also divide the tests by categories of capture devices. For example, one category of capture devices may be Audio/Video capture devices differentiated into sub-categories by physical system bus (1394, USB, PCI), and/or by formats (DV, DVPRO, HD/MPEG2, etc) and/or by functionality (webcam ((simple camera which must be attached to PC to function)), camcorder ((movie camera with attached storage unit)), TV Tuner). The test methodology may have specific tests for a given category and/or sub-category.

Some capture devices may be covered by industry specifications such as IEEE 1394 specifications. In some instances the industry specifications can be set up along multiple levels, such as a mandatory level that must be implemented and a second optional level that is left to the discretion of the manufacturer. The test methodology can test for compliance with both levels of the standards. Further, the method can test various aspects which are not included in the standards but which can increase user satisfaction when the capture device is utilized in a computing system. For example, the tests can be conducted in the presence of other capture devices and while adding or removing such capture devices from the system. In one such example the methodology can test whether plugging a particular capture device into the computer while another capture device is streaming media to the computer will cause the other device to fail. Hence, the methodology can test the interrelationship and effect thereof between multiple devices.

In some implementations, the interrogation allows the test methodology to utilize a generic set of tests which work with multiple types of capture device. The generic methodology can be tailored to a specific capture device with the information garnered from the interrogation of that capture device. In one such example, the test methodology can interrogate a capture device regarding which format or formats the device supports. The method can then test the capture device by instructing the device to stream media in the supported format and then examining the streamed media for compliance with established criteria for that format.

In some implementations the test methodology can select multiple capture devices which it tests simultaneously. In some such implementations the test methodology may test all of the capture devices of the computing system simultaneously. Simultaneous testing may identify interoperability issues which may otherwise go undetected.

The test methodology can further test the selected capture devices to verify compliance with the properties associated with the capture device. For example, a given capture device may report during interrogation that, among other properties, it can control its brightness and that it can change the brightness in increments of 7%. The test methodology may subsequently instruct the capture device to change its brightness by a random amount such as 1%. The test methodology can then monitor the given capture device's response to determine if, in fact, the capture device is able to make the requested adjustment and how the device handles invalid device change requests.

Computer Properties

In some implementations while the test cases are being run against the selected device(s), the test methodology exercises the computer by sending commands to the computer to dynamically change one or more of its properties. For example, the test methodology may direct the computer to switch various display properties described above while streaming media from the capture device.

Display properties can include the number and/or identity of displays coupled to the computer and/or display properties or characteristics associated with individual displays. Such characteristics can include vertical and horizontal dimensions, display resolution, color range, and refresh rate among others. In some implementations the display information can be obtained from the operating system which obtains the information from the display devices. Alternatively or additionally, the method may direct the computer's operating system to switch an individual display to which a capture device under test is streaming media, from a graphical user interface to a native format.

Because different displays and/or display cards can support different display properties, this test can also determine if the capture device under test is communicating with the operating system and making appropriate changes relative to changes to the display state of the computing system. The method can cause a capture device under test to stream media while changing the display state relating to the cards. The capture device should recognize this and adjust accordingly so it can continue to stream properly. The test methodology may also test the capture devices' ability to properly synchronize with the computer through the use of time stamps.

The test methodology may also test the capture devices' ability to deal with a screen saver feature. For example, some capture devices may be configured to override activation of a screen saver while they are streaming media. In one such example, a video camera may be configured to override activation of a screen saver during play back of a home movie so that the user doesn't have to take any affirmative action such as moving his mouse to reactivate the display. In this example, the test methodology can test that the capture device successfully overrides the screen saver feature.

In some implementations the test methodology can change many of these settings using various APIs supported by the operating system. The test methodology can cycle the computer system through individually selected display capabilities or through all the capabilities. The cycle can be sequential or random in various configurations. This dynamic display property change can be run simultaneously with one or more video capture test cases to cover multiple possible combinations of display output. This testing also may be conducted concurrently with adding and/or removing various capture devices from the computer system.

The test methodology can also test a capture device's ability to handle a computer changing its power state. In some configurations, the computer's operating system queries its processor (CPU) regarding what power levels the operating system supports. For example, many computers are compliant with power management levels established by the ACPI (Advanced Configuration and Power Interface Specification) standards board. This standard includes six power states from fully active to powering down peripherals; hard disks; displays; throttling down CPUs; and in the final stage, all power turned off. In some configurations the test methodology can instruct the operating system to switch between each of these power states and then return to the fully on state.

The test methodology can instruct the capture device under test to stream media while simultaneously directing the computing device to switch between its various power states. The test methodology can then monitor the response of the capture device. For example, if the computer powers down such that it cannot receive media from the capture device, the capture device should take appropriate action such as to stop downloading media and to stabilize itself sufficiently to be ready such that if the computer gets reactivated or powers back up the device can reactivate and resume streaming media. The device also may have the capability to take other steps such as powering down until it is needed again and then power back-up. The test can also monitor for such actions to be properly implemented.

The test methodology can start a variety of test cases to run while the power states are changed. Once the computer returns to full power, the test continues with the current test case or cases on the selected devices.

Connect/Disconnect

The test methodology can also test one or more capture devices connected, disconnected and/or reconnected from the computer. The method, as described above, can ascertain what capture devices are coupled to the computer. The method can periodically repeat the step of ascertaining or alternatively direct the operating system to provide notification whenever any capture devices are added or removed. If a capture device is removed, the method can record the change in condition.

The test can instruct one or more capture devices to stream media to the computer and note the response of the streaming capture devices if other capture devices are added and/or removed from the system. Further, if the streaming capture device is removed the test can pause and await return of the capture device. In such an instance the test can monitor a response of an application which is receiving the media from the capture device to determine if the application responds appropriately. The method can further monitor the capture device upon its return to determine if the capture device took appropriate action when it was disconnected. For example, the method can ascertain whether the capture device paused streaming until the connection was re-established. If the streaming capture device was disconnected the test methodology can also resume testing upon ascertaining that the capture device is recoupled to the computer. The tests can also monitor the operating system and/or applications running the devices for appropriate responses to such changes.

Capture/Render

In some implementations where the capture device under test has recording capabilities, act 204 may further test a capture and render cycle of the computer system. In such implementations, the test methodology can cause media to be streamed from the capture device under test to the computer. Various processing or editing can be conducted on the media before the test methodology causes the edited media to be streamed back to the capture device for recording, such as on a tape or DVD. The test methodology can evaluate whether the capture device satisfies various parameters during the capture render cycle. This test also may be conducted simultaneously with one or more other tests described above and/or below. For example, one or more capture devices may be added or removed from the system during the capture render cycle to test the capture device's ability to react accordingly. Another test may examine the capture device's ability to accurately time stamp media upon capture.

Dynamic Format Change

In some implementations the test methodology exercises the captures device's ability to handle dynamic format changes in the test contents. In some scenarios capture devices may render media which changes format one or more times during streaming. For example a DV camera may be streaming data from a tape where part of the data is in one format and part is in another format. In one such example, an IP tuner can switch back and forth between Standard TV or HD TV formats.

In another example, a user may have placed a tape in a first DV camera which recorded by default to NTSC format. After taking some footage in the first DV camera the user switched the tape to a second DV camera which recorded by default to PAL format and took some more footage. Most users would not be aware of such format differences and would simply expect the tape to transfer seamlessly to the PC. The test methodology in this instance can detect the format change and dynamically reconfigure the proper control and data connections needed for the test and proceed with the selected testing methods and/or further evaluate the capture device's ability to handle the format change(s).

Topology

The act also may enquire about and test a topology of one or more capture devices. A captures device's topology can comprise an internal representation of one or more access points or nodes for applications to communicate with the capture device. If the capture device is configured to have multiple access points which can be exposed to multiple users simultaneously, the test methodology can test the operability of one or more of the multiple access points. The methodology also can test usage efficiency of bandwidth available to the capture device's nodes. In one implementation the test methodology discovers a capture device's individual nodes and then tests the functionality of those nodes. For example, upon discovery of the nodes the test methodology can automatically test the properties of individual nodes and then run through various usage scenarios. One test scenario can test an ability of the capture device to support multiple applications simultaneously.

In some of these implementations the test methodology tests both the capture device and the operating system to ensure proper interaction therebetween. The test methodology can monitor the available capacity and delegate capacity for each use. As such the test methodology can test the capture device's ability to allocate some amount of its available bandwidth to various usage applications. For example one such usage scenario which can be tested involves a picture within picture display image, or two small pictures.

The test methodology also can monitor usage so that if one application decreases or ends its bandwidth usage the bandwidth is then reallocated by the capture device to another application. For example, one such test scenario involves instructing the capture device to stream 'live' capture images while downloading stored images. The test can then instruct the capture device to pause the live streaming and monitor whether that bandwidth is reallocated to streaming the stored media. Another test may stream media from the capture device to the computer and simultaneously stream different media from the computer for recordation on the capture device.

Act 206 can provide feedback relating to the acts of testing. The feedback can be provided in any suitable manner. In one such example, a table listing the various tests performed and the capture device's performance can be assembled for a user and/or manufacturer. In some implementations the feedback may be utilized to adjust or improve computer system performance. For example, if switching the computer to a specific power state while a capture device was streaming media caused the capture device to fail, the system may provide a user warning before making such a change in the future. Other computer systems may adjust various properties of the computer and/or capture device based upon the testing to enhance future system performance.

Exemplary Computer Architecture

Figure 3:
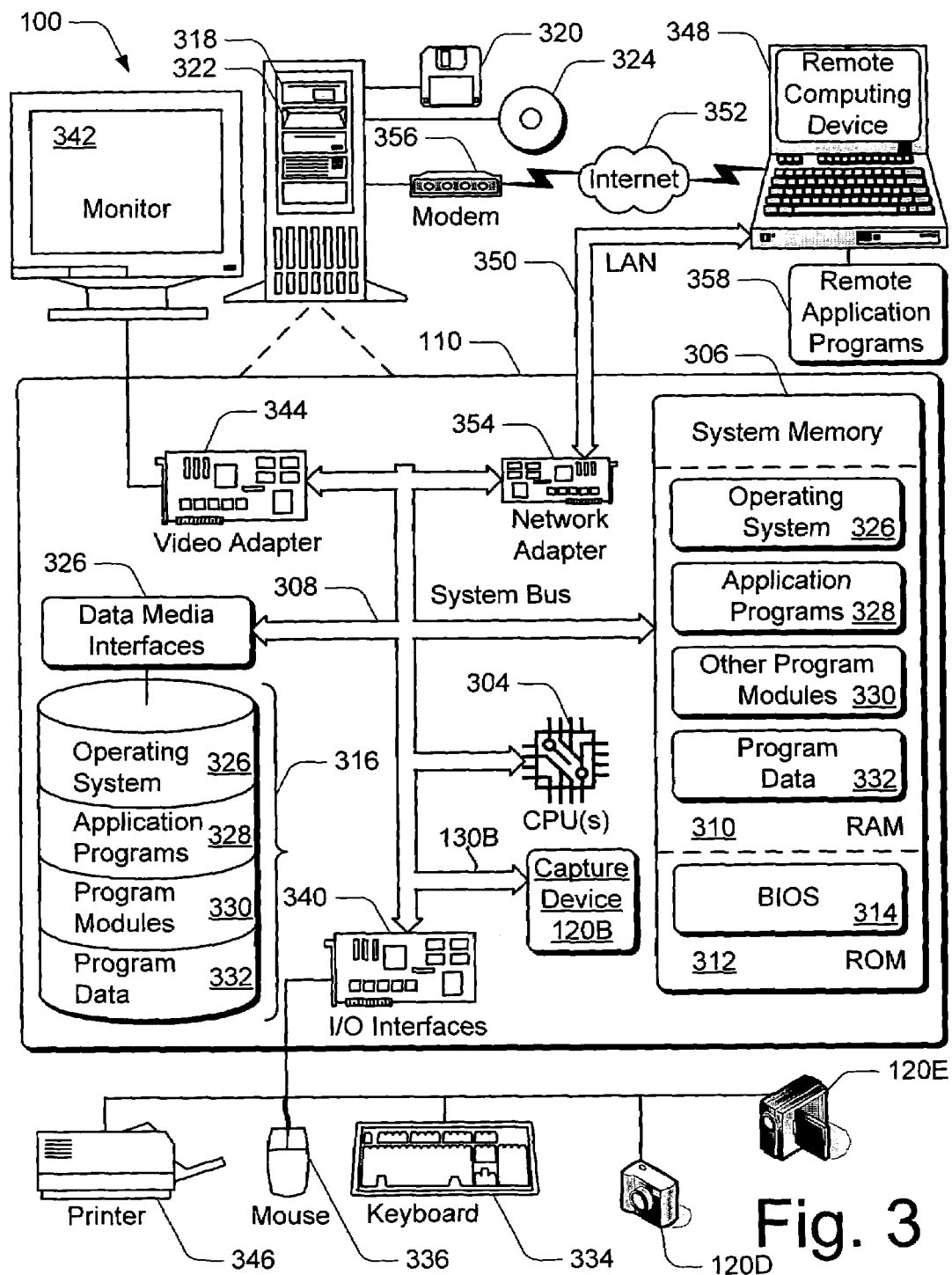
FIG. 3 illustrates an exemplary computing system in which an exemplary method can be implemented for testing various capture devices.

FIG. 3 illustrates an exemplary computing system 100. Exemplary computing system 100 is only one example of a computing system and is not intended to suggest any limitation as to the scope of use or functionality of the architectures. Neither should the computing system 100 be interpreted as having any dependency or requirement relating to any one or combination of components illustrated in the exemplary computing system 100.

The computer and network architectures in computing system 100 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, single or multi-processor systems, minicomputers and the like.

The computing system 100 includes a general-purpose computing system in the form of a computer 110. The components of computer 110 can include, but are not limited to, one or more CPUs 304 (e.g., any of microprocessors, controllers, and the like), a system memory 306, and a system bus 308 that couples the various system components. The one or more CPUs 304 process various computer executable instructions to control the operation of computer 110 and to communicate with other electronic and computing devices. The system bus 308 represents any number of several types of bus structures, including a memory bus or memory controller, a peripheral bus, an accelerated graphics port, and a processor or local bus using any of a variety of bus architectures.

Computing system 100 includes a variety of computer readable media which can be any media that is accessible by computer 110 and includes both volatile and non-volatile media, removable and non-removable media. The system memory 306 includes computer-readable media in the form of volatile memory, such as random access memory (RAM) 310, and/or non-volatile memory, such as read only memory (ROM) 312. A basic input/output system (BIOS) 314 maintains the basic routines that facilitate information transfer between components within computer 110, such as during start-up, and is stored in ROM 312. RAM 310 typically contains data and/or program modules that are immediately accessible to and/or presently operated on by one or more of the CPU(s) 304.

Computer 110 may include other removable/non-removable, volatile/non-volatile computer storage media. By way of example, a hard disk drive 316 reads from and writes to a non-removable, non-volatile magnetic media (not shown), a magnetic disk drive 318 reads from and writes to a removable, non-volatile magnetic disk 320 (e.g., a "floppy disk"), and an optical disk drive 322 reads from and/or writes to a removable, non-volatile optical disk 324 such as a CD-ROM, DVD, or any other type of optical media. In this example, the hard disk drive 316, magnetic disk drive 318, and optical disk drive 322 are each connected to the system bus 308 by one or more data media interfaces 326. The disk drives and associated computer readable media provide non-volatile storage of computer readable instructions, data structures, program modules, and other data for computer 110.

Any number of program modules can be stored on the hard disk 316, magnetic disk 320, optical disk 324, ROM 312, and/or RAM 310, including by way of example, an operating system 112, one or more application programs 328 such as test application 140 described above in relation to FIG. 1, other program modules 330, and program data 332. Each of such operating system 112, application programs 328, other program modules 330, and program data 332 (or some combination thereof) may include an embodiment of the systems and methods described herein.

A user can interface with computer 110 via any number of different input devices such as a keyboard 334 pointing device 336 (e.g., a "mouse") and capture devices. In this particular configuration capture device 120D comprises a digital 'still' camera, while capture device 120E comprises a digital 'video' camera. Though not specifically illustrated the capture devices 120C-120D may have onboard storage capacity via one or more of a tape, a flashcard, and/or a DVD-RW among others. These and other capture devices are connected to the CPU(s) 304 via input/output interfaces 340 that are coupled to the system bus 308, but may be connected by other interface and bus structures, such as a IEEE 1394 port, and/or a universal serial bus (USB) among others. For example, a PCI bus 130B is coupled to system bus 308 and to a capture device 120B comprising a PCI card. In this particular example, the PCI card comprises a TV tuner that has a cable TV input (not specifically illustrated). The skilled artisan should recognize other exemplary configurations.

A monitor or display 342 or other type of display device can be connected to the system bus 308 via an interface, such as a video adapter 344. In addition to the monitor 342, other output peripheral devices can include components such as speakers (not shown) and a printer 346 which can be connected to computer 110 via the input/output interfaces 340.

Computer 110 can operate in a networked environment using logical connections to one or more remote computers, such as a remote computing device 348. By way of example, the remote computing device 348 can be a personal computer, portable computer, a server, a router, a network computer, a peer device, and the like. The remote computing device 348 is illustrated as a portable computer that can include many or all of the elements and features described herein relative to computer 110.

Logical connections between computer 110 and the remote computing device 348 are depicted as a local area network (LAN) 350 and a general wide area network (WAN) 352. Such networking environments are commonplace in offices, enterprise-wide computer networks, intranets, and the Internet. When implemented in a LAN networking environment, the computer 110 is connected to a local network 350 via a network interface or adapter 354. When implemented in a WAN networking environment, the computer 110 typically includes a modem 356 or other means for establishing communications over the wide area network 352. The modem 356, which can be internal or external to computer 110, can be connected to the system bus 308 via the input/output interfaces 340 or other appropriate mechanisms. The illustrated network connections are exemplary and other means of establishing communication link(s) between the computers 110 and 348 can be utilized.

In a networked environment, such as that illustrated with computing system 100, program modules depicted relative to the computer 110, or portions thereof, may be stored in a remote memory storage device. By way of example, remote application programs 358 are maintained with a memory device of remote computing device 348. For purposes of illustration, application programs and other executable program components, such as the operating system 112, are illustrated herein as discrete blocks, although it is recognized that such programs and components reside at various times in different storage components of the computer 110, and are executed by the CPU(s) 304 of the computer.

CONCLUSION

The test methodology and systems described above can test various aspects of a capture device of the computing system. Such testing can include device conformance to applicable standards, device interoperability, and application level end user streaming scenarios.

Although the inventive concepts have been described in language specific to structural features and/or methodological steps, it is to be understood that the inventive concepts in the appended claims are not limited to the specific features or steps described. Rather, the specific features and steps are disclosed as forms of implementing the inventive concepts.

The invention claimed is:

1. A computer-implemented method comprising:
    enumerating streaming media capture devices coupled to a computing device;
    determining power management levels of the computing device; and,
    testing an individual enumerated streaming media capture device while switching the computing device at least between a first power level and a second power level.

2. The method of claim 1, wherein said act of testing comprises simultaneously testing all enumerated streaming-media capture devices.

3. The method of claim 1, wherein said act of testing comprises streaming media from the enumerated streaming media capture device to the computing device during said act of switching.

4. The method of claim 1 further comprising providing feedback from the testing for the individual enumerated streaming-media capture device.

5. One or more computer-readable media having computer-readable instructions which, when executed, implement the method of claim 1.

6. A software architecture embodiment on a computer-readable media, the software architecture comprising a streaming media capture device test application configured to implement the method of claim 1.

7. A computer-implemented method comprising:
    enumerating and testing multiple streaming media capture devices which are coupled to a computer;
    determining power management levels of the computer; and
    simultaneously switching display settings and power levels on the computer during the testing.

8. The method of claim 7, wherein said act of testing comprises testing an ability of an individual streaming media capture device to simultaneously support multiple applications.

9. The method of claim 7 further comprising providing feedback relating to at least one tested property of an individual streaming-media capture device.

10. The method of claim 7, wherein said act of testing multiple streaming media capture devices comprises streaming media from at least a first streaming media capture device, editing said media at the computer, streaming the edited media back to the first streaming media capture device and recording the edited media on the first streaming media capture device.

11. One or more computer-readable media having computer-readable instructions which, when executed, implement the method of claim 7.

12. A software architecture embodiment on a computer-readable media, the software architecture comprising a streaming media capture device test application configured to implement the method of claim 7.

* * * * *